United States Patent [19]
Thorne et al.

[11] Patent Number: 5,958,005
[45] Date of Patent: Sep. 28, 1999

[54] ELECTRONIC MAIL SECURITY

[75] Inventors: John Thorne, Washington, D.C.; Marie L. Davis, Germantown; Michael J. Strauss, Potomac, both of Md.

[73] Assignee: Bell Atlantic Network Services, Inc., Arlington, Va.

[21] Appl. No.: 08/895,745

[22] Filed: Jul. 17, 1997

[51] Int. Cl.[6] ................................................. G06F 17/30
[52] U.S. Cl. .................... 709/202; 709/203; 709/206; 709/207; 709/277; 709/303; 707/9; 707/10; 380/4; 380/25; 380/51
[58] Field of Search ................................... 709/202, 206, 709/207, 227, 303, 203; 707/9, 10; 380/4, 25, 51

[56] References Cited

U.S. PATENT DOCUMENTS

| | | | |
|---|---|---|---|
| 4,881,179 | 11/1989 | Vincent | 395/113 |
| 4,899,299 | 2/1990 | MacPhail . | |
| 4,935,954 | 6/1990 | Thompson et al. . | |
| 5,014,234 | 5/1991 | Edwards, Jr. . | |
| 5,051,891 | 9/1991 | MacPhail . | |
| 5,109,508 | 4/1992 | Mitsumori et al. . | |
| 5,123,104 | 6/1992 | Levine et al. . | |
| 5,170,479 | 12/1992 | Takamoro . | |
| 5,327,555 | 7/1994 | Anderson . | |
| 5,388,256 | 2/1995 | Herbert . | |
| 5,406,557 | 4/1995 | Baudoin | 95/200.36 |
| 5,412,717 | 5/1995 | Fischer | 380/4 |
| 5,504,897 | 4/1996 | Gans et al. . | |
| 5,568,540 | 10/1996 | Greco et al. . | |
| 5,598,279 | 1/1997 | Ishii et al. | 358/402 |
| 5,600,834 | 2/1997 | Howard . | |
| 5,625,818 | 4/1997 | Zarmer et al. . | |
| 5,633,932 | 5/1997 | Davis et al. | 380/25 |
| 5,717,742 | 2/1998 | Hyde-Thomson | 379/88 |
| 5,765,152 | 6/1998 | Erickson | 707/9 |
| 5,786,817 | 7/1998 | Sakano et al. | 345/339 |
| 5,812,669 | 9/1998 | Jenkins et al. | 380/25 |
| 5,822,527 | 10/1998 | Post | 395/200.36 |
| 5,826,269 | 10/1998 | Hussey | 709/206 |
| 5,838,685 | 11/1998 | Hochman | 370/428 |
| 5,864,683 | 1/1999 | Boebert et al. | 395/200.79 |

*Primary Examiner*—Frank J. Asta
*Assistant Examiner*—William D. Thomson
*Attorney, Agent, or Firm*—McDermott, Will & Emery

[57] ABSTRACT

A method, system, and product for communicating data text messages, such as E-Mail, between computers connected to a network while providing selectable degrees of security for each message. The methodology comprises the procedure of creating in the originating computer a data message having a header which specifies, in addition to the address of the intended recipient computer, one or more security parameters which control the processing of the data message in the recipient computer. The security parameters include instructions for erasure of the data message following its storage in the recipient computer. The security parameters also include instructions as to whether or not copying, archiving, forwarding and printing of the data message is permitted. The recipient computer processes the data message in accord with the instructions. The erasure is of such a nature as to render the data message irretrievable following erasure.

54 Claims, 6 Drawing Sheets

ELECTRONIC MAIL SECURITY

FIELD OF THE INVENTION

This invention relates in general to methods and systems for managing the security of electronic documents stored in an interactive information handling system, and more particularly relates to the controlling of the confidentiality of electronic mail communications over networks.

BACKGROUND

In recent years business communications have relied increasingly on exchanges of electronic or E-Mail via desk top or portable computers. Generally speaking E-Mail constitutes a store and forward service for transmission of textual messages transmitted in machine readable form from a computer terminal or computer system. The message sent from one computer user to another is stored in the recipient's mailbox or post office until that person next logs onto the system. The system can then provide for retrieval and delivery of the message.

While this form of communication is now in widespread use, employees and business people in general have been prone to employ less than adequate procedures to protect the confidentiality of many business communications. While most business people recognize that a written document provides a relatively permanent record, they mistakenly assume that an E-Mail message does not. In fact, most E-Mail messages today are readily copied, printed or forwarded, without the sender's knowledge or control. Also, techniques exist for finding and capturing old E-Mail messages that may be stored or once were stored on disk drives in any one of a large number of networked computers or servers. As a result of these factors, it currently is very difficult for a business to ensure that there are no E-Mail messages containing confidential materials or inappropriate comments, which later might be discovered and retrievable by other parties.

While the patent literature contains certain discussions of aspects of electronic document management, it fails to address the particular problem outlined hereinabove.

U.S. Pat. Nos. 4,899,299 and 5,051,891 to MacPhail, respectively entitled Method for Managing The Retention of Electronic Documents in an Interactive Information Handling System, and Method to Manage Transfer of Ownership of Electronic Documents Stored in an Interactive Information Handling System, issued Feb. 6, 1990 and Sep. 24, 1991, discuss document retention and deletion methodology. Although there is no express mention of E-Mail, the text suggests that the documents range from memos and messages to long reports. The originator of a document specifies an ownership expiration date, and the enterprise operating the system establishes an expiration date. An algorithm causes deletion of a document from storage when a particular relationship exists among the current date and the two expiration dates. For example, the system deletes a message if the current date is later than both of the expiration dates.

U.S. Pat. No. 5,568,540 to Greco et al., entitled Method and Apparatus for Selecting and Playing a Voice Mail Message, issued Oct. 22, 1996, deals with displaying voice mail message information and playing voice mail through a computer speaker. The disclosed system may provide a display of messages that can be merged into a single list, including E-Mail messages. As an additional feature, this patent suggests that if a sender does not want the recipient to copy the message for further distribution to others, the sender may designate the message as "Private." The system does not allow copying of such a "Private" message from one mail box to another.

U.S. Pat. No. 4,935,954 to Thompson et al., entitled Automated Message Retrieval System, issued Jun. 19, 1990, discloses an automated message retrieval system. A computer automatically performs various procedures, including deletion of the retrieved messages from storage in the message service computer.

U.S. Pat. No. 5,014,234 to Edwards, Jr., entitled System With Software Usage Timer and Counter for Allowing Limited Use but Preventing Continued Unauthorized Use of Protected Software, issued May 7, 1991, pertains to prevention of continued unauthorized use of protected software. Copies of software are installed for a limited time. If the software is not registered within the time limit, the software is disabled. The system provides a notice indicating an impending software "Self-Destruct" in the event of failure to register.

U.S. Pat. No. 5,600,834 to Howard, entitled Method and Apparatus for Reconciling Different Versions of a File, issued Feb. 4, 1997, deals with reconciling different versions of the files stored in computers at two or more separate locations or sites. Howard utilizes journals or logs of work performed on each file.

Numerous E-Mail applications or programs are currently available commercially. Many of these applications come from personal computer software companies. Examples include Word Perfect Office, Lotus Notes, CCmail, Microsoft Mail, etc. In the computer conferencing area a number of systems have become available. These include Lotus Notes EIES 2, First Class, and SuperKOM. The available systems, for the most part, provide deletion of messages only upon positive action of the recipient or upon the volume of stored data reaching some predetermined threshold. However, SuperKOM has a provision for deleting messages after a certain time unless the user has taken positive steps to so mark the messages as to prevent deletion. SuperKOM has both a personal data base for each user and a common data base for all users connected to the same server. Users of SuperKOM can use search keys on messages in the central data base. Such keys are one way of stopping messages from being deleted. It is also possible to protect messages from being purged in the personal data base of an individual SuperKOM user.

However, these capabilities fall far short of satisfying business needs for managing and protecting the confidentiality of electronic mail communications. Those needs include capabilities to control not only the circulation of messages or electronic documents by the originator, but also the usage of the documents by the recipient for further dissemination and storage. Thus there is an existing need to provide to an E-Mail originator or sender the capability to control the ability of the recipient to copy, forward, print, and store the document. Still further, there is a need for an erasure procedure that goes beyond deletion and precludes recovery.

SUMMARY OF THE INVENTION

It is a primary object of the invention to provide a method and system for satisfying the above described needs.

It is a further object of the invention to satisfy those needs in an effective yet user friendly and readily administered fashion.

One example of the conventional processing of E-Mail in a typical corporate local area network or LAN is preliminarily described to provide a context for a discussion of the methodology of the invention.

In this example of a corporate or business network, each department of the business is provided with its own server. Each such server is a host to a multiplicity of work stations or client computers in that department. Each server and each server client runs the same E-Mail application and each server provides a departmental post office which is subdivided into a plurality of work group or client post offices. The work group post offices serve the individual work stations or client computers in that work group. The term post office is here used to indicate a collection of mail boxes which reside on the respective server.

In sending an E-Mail message in this architecture arrangement, an employee at a work station or client computer composes a message on that computer. This results in the creation of a copy of that message on the hard drive of the composing employee's computer. The computer is connected to the host server and the server also has a copy of the message in its memory. The server includes a mail exchange agent which acts as a store and forward node in transport of the message either to another work station within the same department or to another department. Here it is assumed that the single server acts to deliver the message to a recipient client computer in the same department.

In this typical scenario a copy of the message now exists on a disk at each of the five different agents. These include (1) the hard drive of the composing employee, (2) a first position of a post office disk of the server (sender mail box), (3) a second position of a disk serving as the exchange agent of the server, (4) a third position in the post office disk of the server (recipient mail box), and (5) the hard drive of the recipient or addressee computer. If the message goes to another department it will pass through at least one additional server, and there will be even further instances of storage of the message.

With respect to the duration of retention of the message, the second, third, and fourth instances of storage of the message, namely, those under control of the server, are deleted in a routine maintenance cycle pursuant to predetermined tables. The deletion of the first and fifth instances of storage of the message, namely at the computers of the originator and recipient, are under control of the originator and recipient. If the recipient copies, archives or forwards the message, additional instances of storage are created. Still further, the recipient may print the message and thereby create a hard copy susceptible to unlimited copying.

In conventional practice the erasure of records normally constitutes deletion. However, when files are deleted the data is not physically removed from the disk. Typically, some or all of the characters constituting the file name or address are altered with a special character or erased from the internal file allocation address table. This has the effect of rendering the disk space occupied by the file available for reuse, i.e., the file is marked for deletion. Until the space is reused it is possible to "undelete" and recover the file data. Further, techniques are available which make possible the recovery of data even after the disk space has been reused, depending upon the extent of reuse.

Compacting of data to recover disk space is a process which normally involves a single overwrite operation of data. Such a single overwrite normally will not prevent recovery of the overwritten data. The National Security Agency (NSA) specification for data erasures require that the file be written over seven times using an alternating byte write sequence of: 00, FF, 00, FF, 00, FF, F6. Normal commercially available Disk CleanUp erasures simply write the F6 character to deleted files.

It is a primary object of the invention to provide a method for managing the retention of preselected data in a manner to effectuate the desired degree of security for designated information.

It is another object of the invention to provide a methodology for achieving this goal in a straight forward, user-friendly manner.

With the foregoing ends in view, the invention finds embodiment in certain combinations of elements, system architectures, methodologies, and series of steps by which the objects aforementioned and certain other objects are hereinafter attained, all as more fully described with reference to the accompanying drawings and the scope of which is more particularly pointed out and indicated in the appended claims.

DESCRIPTION OF THE PREFERRED EMBODIMENT

Figure 1:
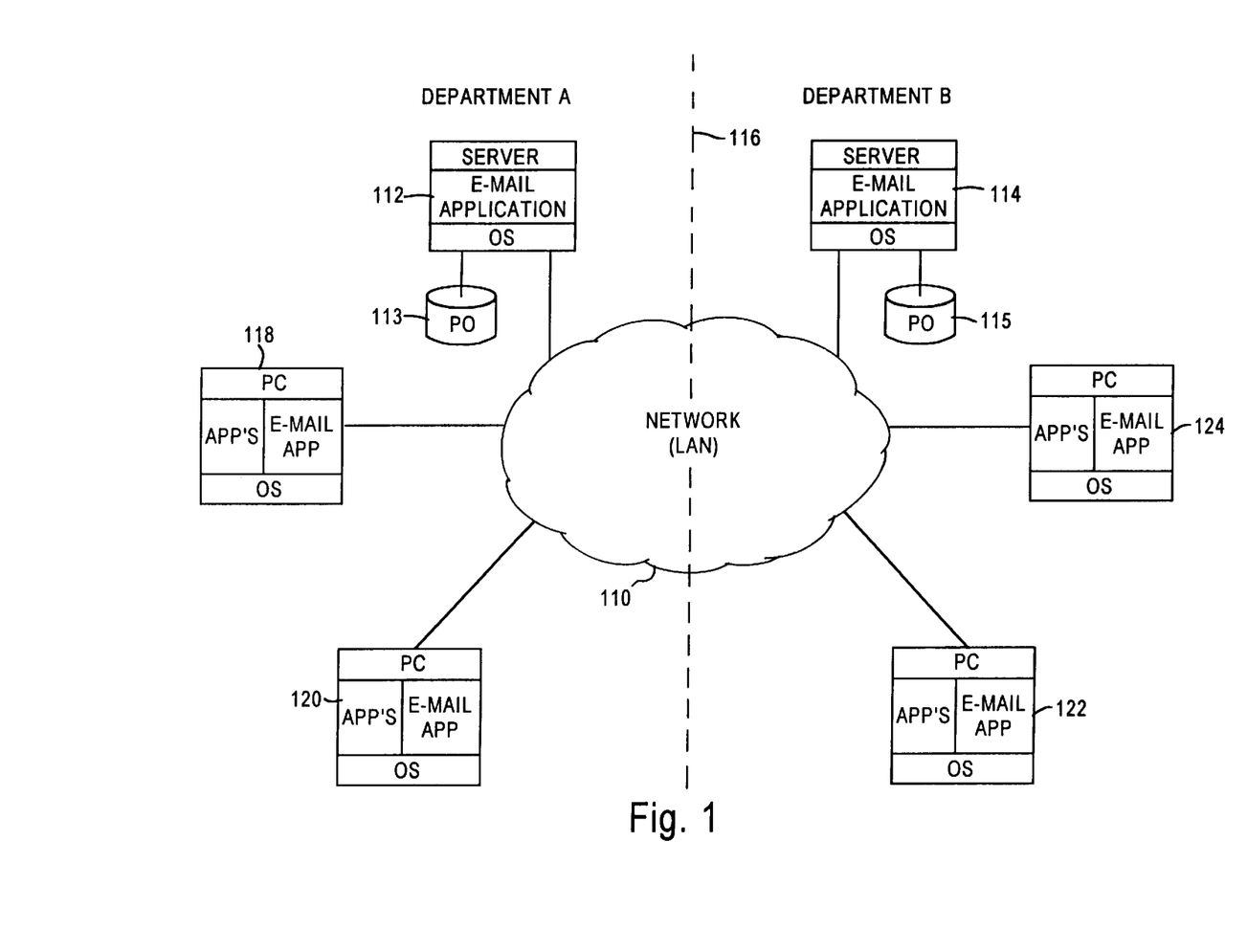
FIG. 1 is a diagrammatic illustration of the architecture of a typical network, such as a Local Area Network (LAN) in which the method of the invention may be implemented according to a preferred embodiment.

Referring to FIG. 1 there is shown a typical local area network or LAN 110 which may serve a business sufficiently large to need a pair of servers. Although shown as a single LAN configuration, the invention is equally applicable to other communications networks including the PSTN, Internet, cellular and paging networks, individually and in combination. The servers 112 and 114 are shown serving different areas of the network, such as, by way of example, different departments of the company. Two such departments are indicated as Department A and Department B divided by the broken line 116. Each server has an operating system or OS running the same E-Mail application. Each server also has a storage that functions as a post office and sub-post offices for the computers which it serves. These storages are indicated at 113 and 115 in FIG. 1. The server 112 and its post office 113 generally serve the client computers in Department A, while the server 114 and its post office 115 generally serve the client computers in Department B.

Functionally, the network operates to allow each terminal to communicate with the servers and to one or more other terminals using established communication protocols, so that the various communication links are transparent to the users.

Figure 2:
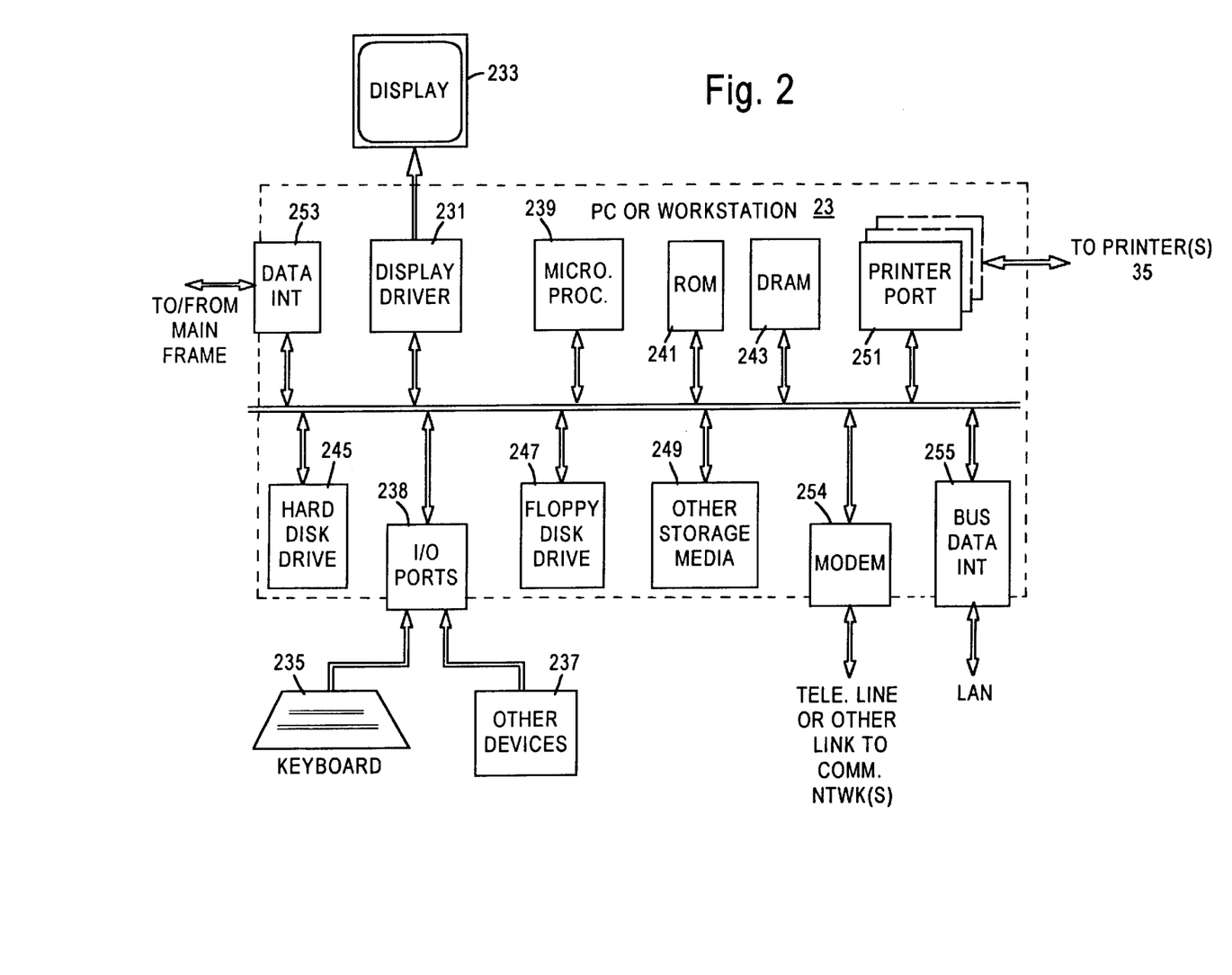
FIG. 2 is a diagrammatic illustration of a typical work station, computer, or PC used in the network of FIG. 1 illustrating the functionality which is provided.

FIG. 2 is a block diagram of the functional components of a typical computer 118. The computer 118 is a typical workstation or personal computer (PC), although other computer platforms may be used, including laptop and palmtop portable computers and dedicated platforms such as Web-TV.

The main processing element of the PC or workstation computer 118 is a programmable central processing unit (CPU). In the illustrated example, the CPU is a microprocessor 239. The control code for certain basic functions of the microprocessor is stored in a read only memory (ROM) 241. The PC or workstation computer 118 also includes one or more working memories, such as the dynamic random access memory (DRAM) 243, cache memory (not shown), and the like. The microprocessor runs programs loaded into the DRAM 243 from other storage devices.

To store programs, the computer 118 includes a number of different bulk storage systems. In the illustrated example, the computer includes a hard disk drive 245 and one or more floppy disk drives 247, and may include other storage media 249, such as a CD ROM drive, a digital tape drive or the like.

An internal bus system 244 provides two way data communications between the various elements of the computer. In particular, the microprocessor 239 receives digital signals from and sends a variety of digital signals to the other computer components via the bus 244. The computer typically connects through a display driver 231 to a display 233, such as a color cathode ray tube (CRT) type monitor. A user operates a keyboard 235 or another type of input device 237, such as a mouse, trackball or joystick, to input various information to the computer. The input devices 235, 237 connect to the computer through appropriate input ports, represented by the block 238 in the drawing.

The operating system program allows the microprocessor 239 to respond to signals from the input devices 235, 237 and produce signals through the driver to 231, to effectuate a desired user interface. For example, a computer running a Windows type operating system provides a graphical user interface, for the operating system functions as well as for applications running on the operating system. The operating system also enables the microprocessor to execute various other application programs.

The computer includes one or more systems enabling communication with other data systems. In the illustrated example, the computer includes one or more high speed printer ports 251 coupled to the bus 244. The computer also includes one or more data interfaces 253 and 255, to enable communications with data devices either via direct connections, such as parallel ports, or, via bus interface 255, with a local area network (LAN) interface which enables communication with networked data devices.

The PC or workstation computer 118 may also include a modem 254 (or other communication interface) coupled to the bus 244. The modem 254 provides a two-way data communication coupling to a telephone line or other communication network link. The modem 254 sends and receives electrical, electromagnetic or optical signals which carry digital data streams representing various types of information in the format appropriate to the particular link.

The network link typically provides data communication through one or more networks to other data devices. For example, the link may provide a connection through the local telephone network to a host computer or to data equipment operated by an Internet Service Provider (ISP). The ISP equipment in turn provides data communication services through the world wide packet data communication network now commonly referred to as the 'Internet'. The local telephone network and the Internet both use electrical, electromagnetic or optical signals which carry digital data streams. The signals through the various networks and the signals on the link and through the modem 254 which carry the digital data to and from the computer are exemplary forms of 'carrier waves' transporting the information.

The computer 118 can send messages and receive data, including program code, through the network(s), the network link and the modem 254. In the Internet example, a server might transmit requested code for an application program or upgrade through the Internet, the equipment of the ISP, the local telephone network and the communication interface. In accord with the invention, one of the downloaded applications might include an E-Mail application.

The computer can receive a new application via the modem 254, bus interface 255, or data interface 253, or via an insertable storage media, such as a floppy in drive 247 or a tape or CD in another drive 249. When a new program is loaded, the microprocessor loads the received code from the drive 247, 249 or the modem 254, bus interface 255, or data interface 253, typically onto the hard disk storage 245. In this manner, the computer 23 may obtain application code in the form of a carrier wave, or the computer may obtain application code as data stored on a floppy disc, a compact disc or other transportable media. If the code represents an application program, the microprocessor 239 later loads the code into random access memory 243 for execution.

Thus the program software, including E-Mail applications, may reside at different times on a variety of media, including the various memories, disk drives and other storage media. The computer platform also may receive software in the form of carrier wave signals bearing digital code, via various communication ports and interfaces, such as the data interface(s) 253, 255 and the modem 254.

The operation of the LAN 110 in the handling of E-Mail according to one preferred embodiment of the invention is now described. All processor agents, including all servers and client computers, are provided with and run an E-Mail application which provides the following functions:

1. Designation of secure files as such.
2. File forwarding enablement or disablement.
3. Copying enablement or disablement.
4. Printing enablement or disablement.
5. Specification of number of prints enabled.
6. Archiving enablement or disablement.
7. Specification of number of readings enabled.
8. Specification of erase date.
9. Specification of display time.

The E-Mail application will present a user who enters into an originating computer a "Compose E-Mail command", i.e., a template for specifying the security parameters which the message originator desires. According to a preferred embodiment of the invention the user is presented with a template including the following entry fields:

1. Designate document "Secure" ---"Yes/No."
2. Designate security classification ---"Secret/Confidential/Restricted."
3. File forwarding "Enable" "Disable."
4. Copy "Enable" "Disable."
5. Print "Enable" "Disable."
6. Number of copies "__.—"
7. Archive "Enable" "Disable."
8. Display "____" times.
9. Automatically Erase "____" days from today's date.
10. Erase Date "___/___/___"
11. Send Only to Another Secure System "Yes" "No".
12. Warn If Addressee System Not Secure "Yes" "No".

The entry fields in the template would be typically populated with default settings that would be provided according to a setup file of the user. Thus, the user need only indicate changes to the normal security settings when preparing an E-Mail message.

Figure 3:
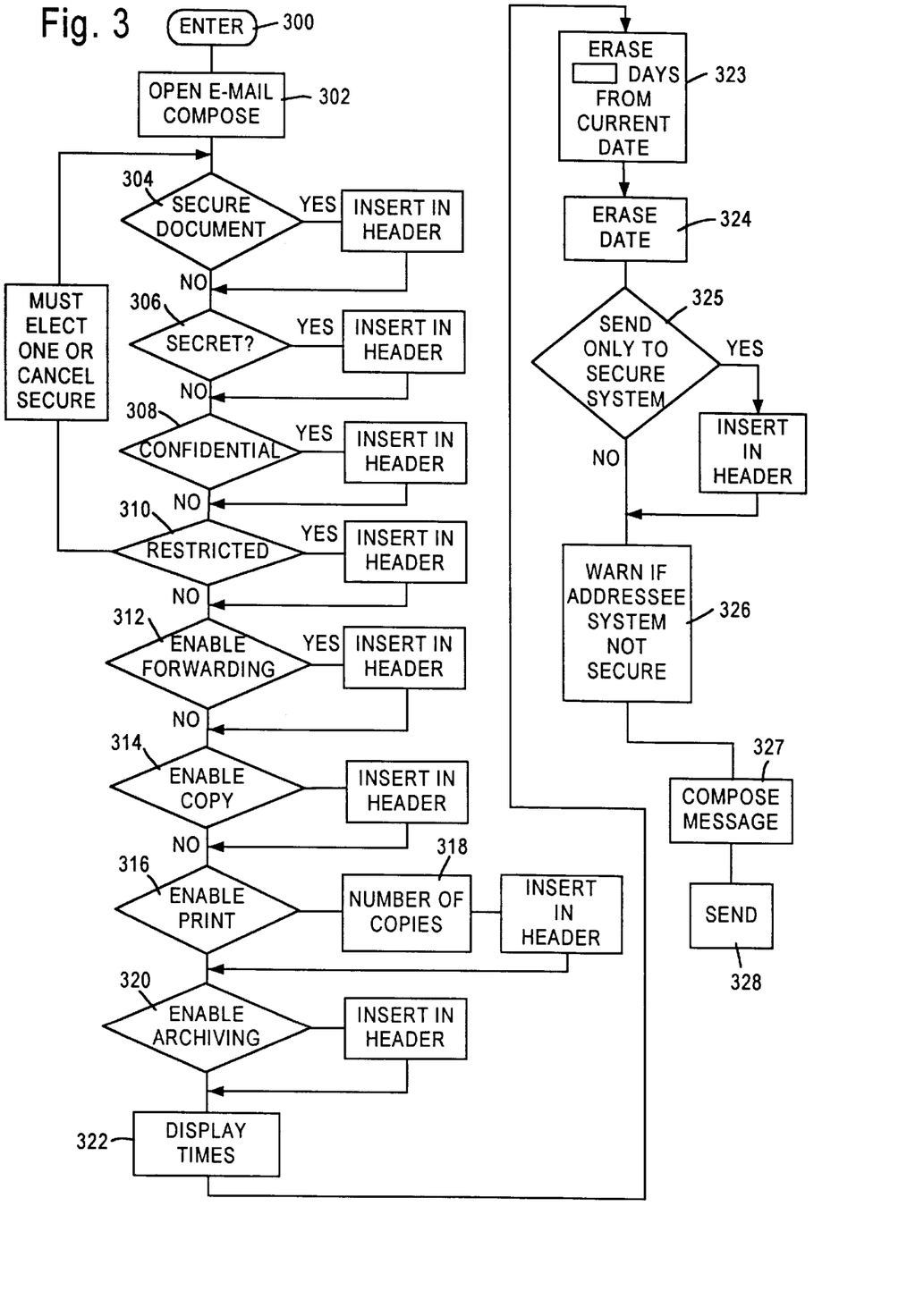
FIG. 3 is a simplified flow chart showing the operation of composing and sending an E-Mail message

The operation of composing and sending a message is illustrated in flow chart form in FIG. 3. Referring to that figure, entry into the E-Mail program is shown at 300. At 302 the user inputs the command to open the E-Mail "Compose" graphical interface. Upon opening the compose graphical interface, the user is presented with a template containing the above described fields to be completed. As stated, the fields of the template typically appear with the default values so that the user may elect to retain all such values. Alternatively the user may change one or more of these responses.

At 304 the user may select "Yes" or "No" in response to the inquiry as to whether or not it is desired to designate the message as a secure document. In this illustration it is assumed that the user enters "Yes" by keyboard or mouse entry or that "Yes" is designated by default.

At steps 306, 308, and 310 the user selects the class of security which it is desired to impose. This selection may control the maximum duration of life which the user is able to attach to the document. For example, selection of a "Secret" classification may be programmed to limit the erasure date to a maximum of twenty-four hours. This will be reflected by the graphical interface by automatic entry of the erase date, which otherwise may be optional when step 324 is reached. If the user were to select the "Restricted" classification, which is the lowest secure classification, then the maximum life of the document may be a week, by way of example.

The selection of a security classification also ensures that the document will not only be erased or deleted but will be purged from the disk in a manner to prevent its subsequent retrieval. For example, the file or the entire deleted portion of a disk may be subjected to a cleaning or purging according to NSA specifications. This disk cleaning or purging in response to detecting a security designation is in addition to any routine disk clean up or purge which the network may otherwise conduct as a matter of course.

Upon the recording of an E-Mail document by any processor in the network which is using an E-Mail application pursuant to the invention, the processor recognizes the security designation. Each security designation is assigned a maximum life for the message or document to which it is applied. Upon recognizing the security designation the recording processor derives from a stored table the life to be assigned to that particular document and calculates the date by which that document should be purged. Upon the arrival of that date the processor schedules the disk on which the message was recorded for a complete purging of that file and all deleted files on that disk at the preselected low traffic time of day at which disk purges are to be conducted.

With respect to client computers which may not be on continuously, the application will initiate an algorithm which causes the computer to run the purge routine as a preliminary to shut down. Thus the affixation of the security designation assures that the message will be purged irretrievably after passage of the predetermined time period. In the case of client computers which periodically go into a sleep mode, the purge may be accomplished immediately prior to shutting down the disk as a function of going into a sleep mode.

At step 312 the user elects to either permit or prohibit forwarding of the message. The election as to whether or not to allow copying is entered at step 314 by selecting "Enable" or "Disable." At step 316 the print permission is either selected or not. If the user chooses to enable printing the number of copies field is activated and the user enters the number of copies at 318. At step 320 the user elects to permit or not permit archiving. At step 322 the user may enter the number of times that the recipient will be allowed to display the message. Optionally the application may also allow the sender of the message to choose the duration of display (not shown). At 323 or 324 the user may enter the erasure date. Entry of a specific number of days in step 323 will cause the application to supply the date at step 324 or vice-versa.

As previously described this option may be circumscribed by the class of security which the sender has chosen. Thus, in the case of the twenty-four hour life limit above described for a "Secret" classification, the date would be automatically entered in this date field by the E-Mail application. At step 325 the user elects to send the message only to a secure system. At step 326 the user directs that a warning be provided if the addressee system is not secure.

Having completed the above fields in the template the "Compose Message" button is actuated at 327. A blank message screen is then presented to the user and the message may be entered. When the user is satisfied with the message the "Send" button may be clicked or keyed at 328. The message is thereupon dispatched on the network.

Figure 4:
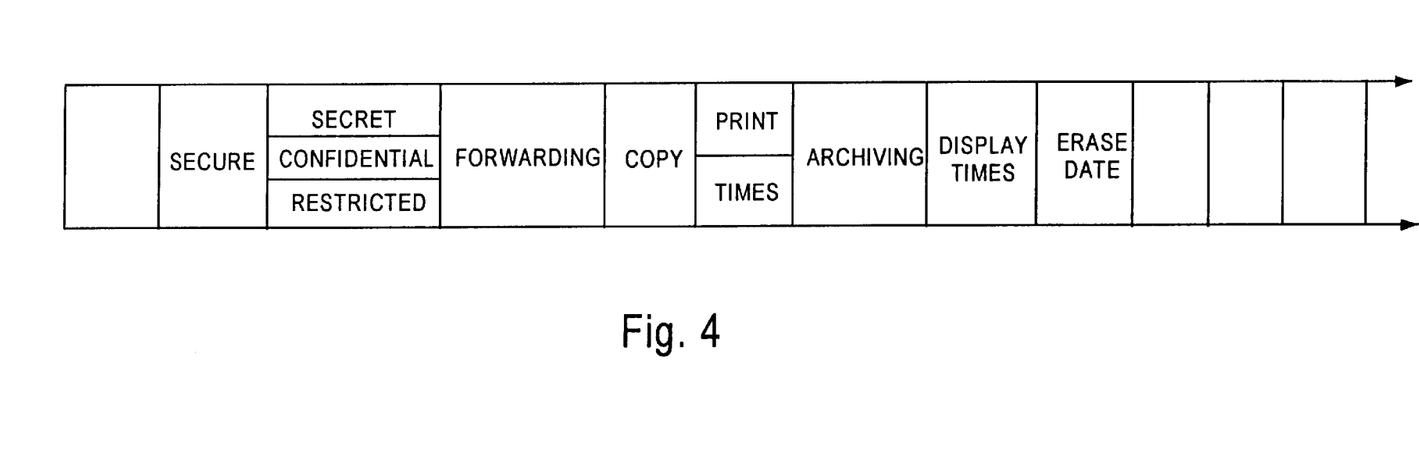
FIG. 4 is a diagrammatic illustration of a typical E-Mail header which may be used according to one preferred embodiment of the invention.

The E-Mail application in use according to the invention responds to the setting of the fields of the template by causing the packet assembler to insert into the message packet header flags to cause each recipient computer or processor to respond to the commands created by completion of the template. An exemplary header of that type is illustrated in FIG. 4. The E-Mail application running on computers connected to the network is also programmed to respond to a default flag to set maximum security. Such a default flag may be set in the situation where the sender of a message designates the message as a secure message but fails to complete the remainder of the template and select a specific classification designation. A preferable option is to compel the user to insert a choice as to classification in order to proceed with sending of the message as a secure message.

It has been previously stated that, according to one embodiment of the invention, all computers connected to the network and within the network are running the same E-Mail application. In one preferred embodiment of the invention all client computers of all servers in the network are capable of using E-Mail only by operating off of the server E-Mail application, i.e., it is mandated that the client E-Mail software has to run from the server. No client computer resident E-Mail applications will operate with the system. This feature protects against computer operators or users installing in their computers application upgrades which have not been installed in the server applications. In many instances the installation of such an upgrade in one computer and not the other leads to unpredictable problems and could have the potential capability of defeating the security procedures.

According to an alternate embodiment, server software is verified by the E-Mail system as compatible with the requested security features prior to transmission of a message. If the servers are compatible, e.g., employ an automatic delete capability, then the message is transmitted. In the absence of such confirmation message indicating server E-Mail security functional capabilities, the user is warned and given the option to override and have the message sent (or not).

It is a further feature of the security system of the invention that all server disks and the disks of all computers that are connected to the network and running are subjected to a complete disk clean-up at a low traffic time at least once each twenty four hours. By way of example, such a disk clean-up may be routinely carried out each morning at 2:00 AM.

The deleting of a file merely removes the files directory entry. But the data itself remains on the disk. Disk CleanUp is a small utility designed to clear previously deleted files. Disk CleanUp completely eliminates the contents of deleted files. The clean up will not delete files from a disk, but rather cleans up the empty space on the disk by creating a temporary file named "CleanUp" on the drive being cleaned. The file is written to and expanded until the entire drive has been cleared. When disk clean up is complete the temporary file is automatically removed. In effect the file constitutes a temporary or dummy file which simply fills up all empty disk space. In the case of erasure or purge of a specific message, the temporary or dummy file may fill the disk space occupied by that message.

The cleanup can be to NSA specifications or to a lower standard depending upon the procedures programmed into the utility associated with the E-Mail application. The NSA specification is preferred despite the fact that the NSA erasure method requires additional time. In the network described as exemplary of the preferred embodiment, control may be exercised over all access and elements, such as, the servers and all clients. When a message with an erasure flag proceeds through the processing elements of a network operated according to one embodiment of the invention, each such processing element (such as a server), receives it and acknowledges receipt and sends it forward until it reaches the addressed terminal. According to one optional feature of the invention, each forwarding processor, upon receiving acknowledgement of receipt by the next agent, may automatically erase and purge the message. Thus the message may be immediately deleted in each intermediate processor. In addition, the receiving addressee processor sets the message into the applicable algorithm for complete purging at the next algorithm purging which is established for a message of that particular security classification. This purging may be in addition to any periodic purging which may have been established in the system.

Figure 5A:
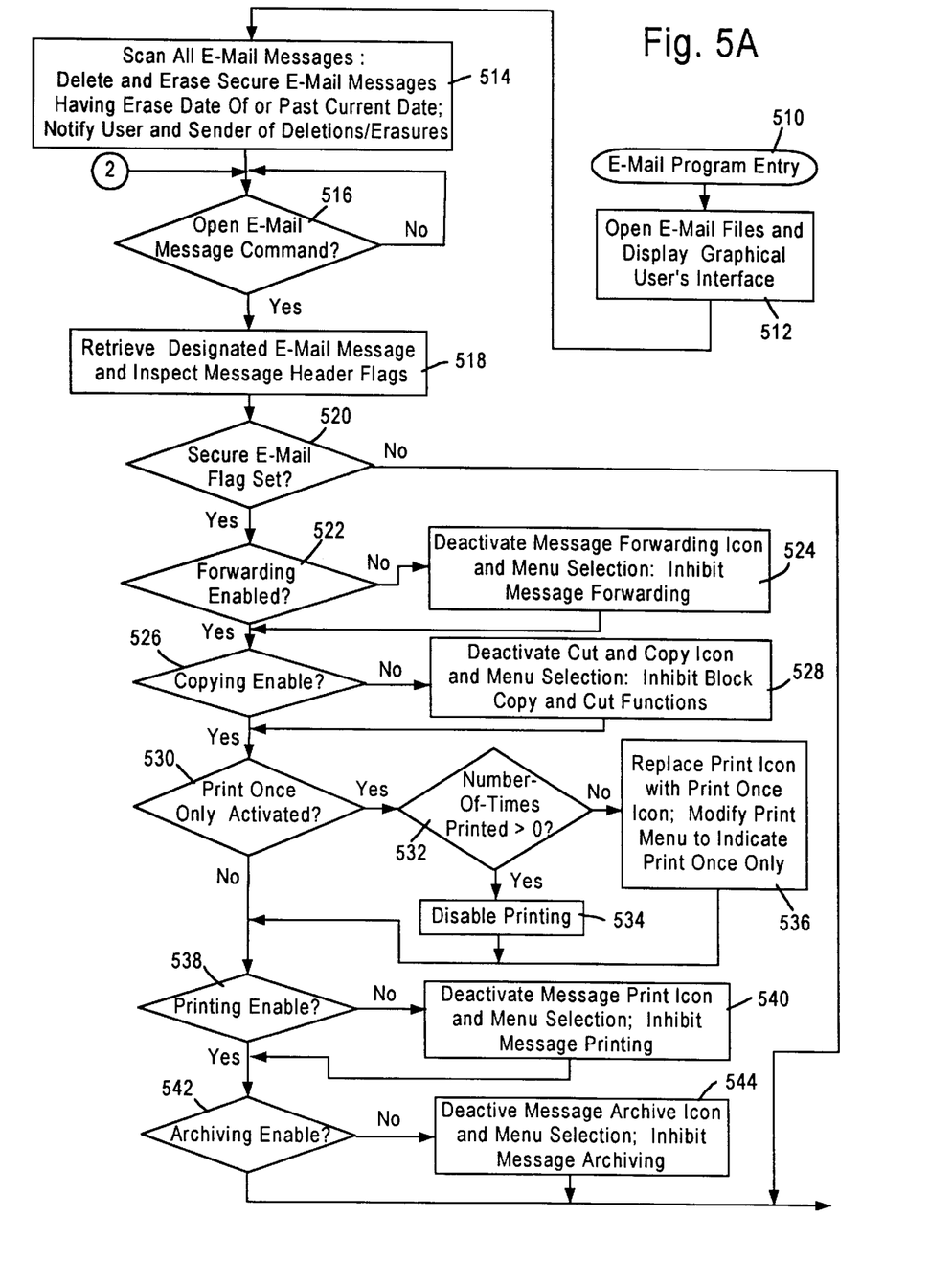
FIGS. 5A–5B are a simplified flow chart showing the processing of a received E-Mail message according to the invention.
Figure 5B:
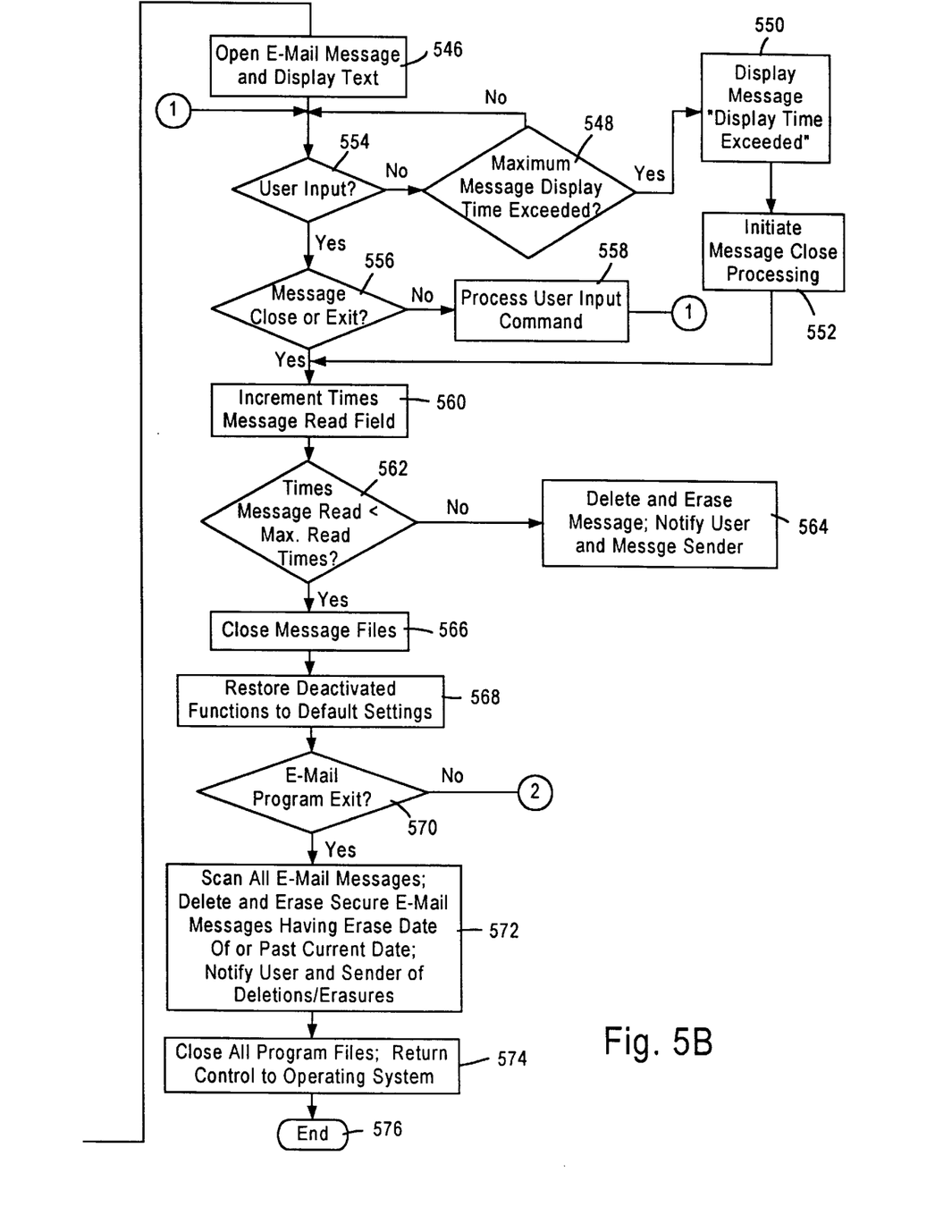

Referring to FIG. 5 the E-Mail message retrieval procedure is now described. The procedure starts at 510. At 512 the E-Mail files are opened and typically a graphical user interface is displayed. At 514 the application automatically scans all E-Mail messages to locate any secure messages which are subject to a ripe purge demand but somehow remain in the client computer. Such messages which are located are thereupon purged and a notification of such purge is sent to the user as well as to the originator or sender of the message.

At 516 the system ascertains whether the user is requesting to open any E-Mail files. The system simply loops until a request is received. At 518 the system retrieves designated E-Mail messages and inspects the message header flags. At 520 this inspection determines whether a secure E-Mail flag has been set. Although not specifically illustrated the determination that the document is secure initiates a purge routine in the particular processor which is reading the header. This routine mandates that the disk will be purged of the message pursuant to the appropriate routine which has been identified. In store and forwarding processors this may be immediately subsequent to receipt of an acknowledgement of the forwarding. Purging may also be used at a low traffic time as previously described.

At 522 the system ascertains whether forwarding has been enabled. If forwarding has not been enabled, the message forwarding function is deactivated and the message forwarding icon is dimmed or grayed out or not highlighted. Message forwarding is inhibited. This is shown at 524.

At 526 the system ascertains whether copying is enabled. If not, all possible copying methods are disabled. This would include cut and paste, copy and paste, send to, save, save as, etc. This is shown at 528.

At 530 the system ascertains whether print once has been specified. If it has been specified, the system counts the first printing cycle at 532. If one print cycle is detected, printing is disabled at 534. If a print cycle has not occurred and is not detected at 532, then the print icon is replaced with a print once icon, and any applicable menu box is modified to indicate that print once is in effect. If the answer at 530 is affirmative, i.e., printing has been enabled but print once has not been enabled, the system proceeds to 538. If printing has not been enabled the message print function is disabled and the message print icon and menu are deactivated. Printing is inhibited. This is shown at 540. At 542 the system ascertains whether archiving has been enabled. If the response is negative archiving is disabled and the message archive icon and associated menu are deactivated. Archiving is inhibited. This is shown at 544.

According to a preferred embodiment of the invention the only type of printing of secure messages which is permitted is limited to printing with a watermark such as "Do Not Copy." The printing is also limited to such printing as uses a format which is not subject to ordinary reproduction. This may constitute gray-on-gray printing or printing which uses a combination of background and font colors which will not easily copy.

At 546 the E-Mail message is opened and the text displayed. The opening of the display starts a timer count, and at 548 this is observed to determine whether the maximum display time has been exceeded. This feature is provided in order to insure that a user does not bring the message up and leave it displayed for hours. At the passage of the specified display time, the application displays a "Display Time Exceeded" message, and processing to close the message is initiated. These steps are shown at 550 and 552. The message display is then closed as if the user had issued a close command.

It is possible that the user may enter a command prior to the automatic closure of the message and this determination is made at 554. Executable commands would be "Close" or "Exit." These commands are sensed at 556 and at 558, and the system processes the user close or exit command.

It is anticipated that the life of the display may be extended upon specific user input prior to expiration of the initial message life count-down. One such executable input would be if the user indicates that a reply is to be sent. However, even in this situation the duration of the display will be subject to an extended but not unlimited time period. Thus, if the user enters a reply input and commences to enter the address and text of a reply, the display may continue so long as the text entry does not pause for a time exceeding a maximum pause imposed by the application. If the user timely enters the reply text and enters the send command, this is executed at 558.

When such a reply is processed, it is a feature of the invention that the application does not reproduce or include the original message in such reply. The replying processor retains the message in its memory subject to the constraints imposed by the security classification, but does not send a copy of the original message back through the system to the originating processor. This minimizes the number of sites and number of times that a secure or classified message is stored.

In due time the display is discontinued, either upon expiration of the maximum display time or pursuant to command of the user. At 560 the message read times counter is incremented. A determination as to whether or not the times read or displayed has exceeded the specified maximum is made at 562. If this does occur the message is deleted and purged. Notification is sent to the user and the sender. These steps are shown at 564.

The remainder of the steps effect a closing of the E-Mail function. Thus at 566 the close message files is entered. Optionally, at this time the application may check for the existence of an unexecuted purge situation. If such a situation is found, the purge may be executed at this time prior to closing of the E-Mail application. At 568 the deactivated functions are re-activated and restored to their default functions. At 570 the user may enter an exit command. If this occurs the application scans all E-Mail messages, deletes and purges secure messages having erase dates of or past the current date, and notifies the user and sender of such deletion. This is shown at 572. At 574 all program or application files are closed and control is returned to the operating system. The process ends at 576.

If the user does not enter an exit command at 570, the application returns to step 516 to permit the user to view and process E-Mail messages which have not been classified as secure and which do not invoke the security application processing.

The invention also comprehends as an optional feature that, if the user continues the operation of the E-Mail application, the application periodically, for example every hour, will check to ascertain if any security step needs to be taken. If such a condition is found to exist the application will proceed to process the condition in the various manners above described. As a further option, since the E-Mail application is running in the server, this periodic check and others can be made in the server, regardless of whether or not the user has the E-Mail application running.

Also included as optional procedures according to the invention are acknowledgement that the message has been received and that the message has been displayed. These acknowledgments also may be effected by suitable flags in the message header. An additional acknowledgment which may be flagged in the header is a notification to the sender that the message has been printed, i.e., a print receipt, and/or that the message has been deleted either manually or automatically. A still additional feature includes a graphic or numerical indication of the display time remaining before deletion.

It will be appreciated that multiple delete and purge routines have been described. These may be used selectively or in combination at the option of the network operator. Client computers are frequently subject to usage by one or a limited number of employees during business hours. On the other hand, servers operate to serve the network and may be subject to heavy traffic. As a result it may be desirable to limit time consuming purge routines in servers to a greater extent than in client computers. Thus servers may be set to perform deletions during heavy traffic hours and to perform purges only at the periodic low traffic periods. The particular routine is under control of the network operator.

According to another embodiment of the invention the receiving system may include resident E-Mail applications which are different but which are verified to be compatible with those features required to accommodate the message to be sent by the sending system. Thus, prior to transmission of a secure message, the sending station would request verification from the intended recipient's E-Mail system that it complies with the security features required to handle the intended message. Upon receiving verification that the receiving system is security compliant, i.e., includes all features required to process the intended message, the sending system then transmits the corresponding E-Mail message for receipt by the destination system. If the recipient system does not include some or all of the required security features so as to properly handle the intended E-Mail message, the sending system would be notified and the user given a warning and option to send the message without the security features which could not be accommodated by the intended recipient system.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method of communicating between processing devices comprising the steps of:
   a) creating in a first processing device a header for a data message;
   b) populating said header with address data and processing instruction data;
   c) creating said data message;
   d) storing said data message in a second processing device;
   e) displaying said data message;
   f) processing said data message in said second processing device responsive to said processing instruction data;
   g) said processing including the step of erasing said data message from storage in said second processing device in accordance with said processing instruction data.

2. A method according to claim 1 wherein said erasing step comprises over-writing said data message multiple times.

3. A method according to claim 2 wherein successive over-writing steps utilize different over-write characters.

4. A method according to claim 2 wherein said erasing step renders said data message irrecoverable.

5. A method according to claim 2 wherein said erasing step is performed according to the erasure specifications of the National Security Agency.

6. A method according to claim 2 including the step of disabling printing of said data message by said second processing device.

7. A method according to claim 2 including the step of enabling a single printing of one copy of said data message by said second processing device.

8. A method according to claim 2 including the step of limiting the time duration of display of said data message in accordance with said processing instruction data in said header.

9. A method according to claim 2 including the step of disabling copying of said data message in said second processing device.

10. A method according to claim 2 including the step of disabling forwarding of said data message in said second processing device.

11. A method according to claim 2 including the step of designating said data message with a security parameter.

12. A method according to claim 11 including the step of periodically erasing data messages stored in said second processing device.

13. A method according to claim 2 including the step of disabling archiving of said data message by said second processing device.

14. A method according to claim 2 wherein successive over-writing steps utilize different over-write characters, and wherein said erasing step renders said data message irrecoverable.

15. A method according to claim 14 including the step of disabling printing of said data message by said second processing device.

16. A method according to claim 14 including the step of enabling a single printing of one copy of said data message by said second processing device.

17. A method according to claim 14 including the step of limiting the time duration of display of said data message in accordance with said processing instruction data in said header.

18. A method according to claim 14 including the step of disabling copying of said data message in said second processing device.

19. A method according to claim 14 including the step of disabling forwarding of said data message in said second processing device.

20. A method according to claim 14 including the step of disabling archiving of said data message by said second processing device.

21. A method according to claim 2 wherein successive over-writing steps utilize different over-write characters, and wherein said erasing step renders said data message irrecoverable, and including the steps of disabling printing of said data message by said second processing device, and limiting the time duration of display of said data message in accordance with said processing instruction data in said header.

22. A method according to claim 21 including the steps of disabling copying of said data message in said second processing device.

23. A method according to claim 22 including the step of disabling forwarding of said data message in said second processing device.

24. A method according to claim 23 including the step of disabling archiving of said data message by said second processing device.

25. A product bearing a sequence of computer executable instructions, said sequence of computer executable instructions, when executed in a pair of computers, comprising instructions for performing the steps of:
    a) creating in a first of said computers a header for a data message;
    b) populating said header with address data and processing instruction data;
    c) creating said data message;
    d) storing said data message in a second of said computers;
    e) displaying said data message;
    f) processing said data message in said second of said computers responsive to said processing instruction data;
    g) said processing including the step of erasing said data message from storage in said second computer in accordance with said processing instruction data.

26. A product according to claim 25 wherein said erasing step comprises over-writing said data message multiple times.

27. A product according to claim 26 wherein successive over-writing steps utilize different over-write characters.

28. A product according to claim 26 wherein said erasing step renders said data message irrecoverable.

29. In a communication network having connected thereto at least one server and a plurality of client computers a method of communicating between said client computers comprising the steps of:
    a) creating in a first client computer a header for a data message;
    b) populating said header with address data and processing instruction data;
    c) creating said data message;
    d) storing said data message in a second client computer;
    e) displaying said data message;
    f) processing said data message in said second client computer responsive to said processing instruction data;
    g) said processing including the step of erasing said data message from storage in said second client computer in accordance with said processing instruction data.

30. A method according to claim 29 wherein said erasing step comprises over-writing said data message multiple times.

31. A method according to claim 30 wherein successive over-writing steps utilize different over-write characters.

32. A method according to claim 30 wherein said erasing step renders said data message irrecoverable.

33. A method according to claim 29 including the step of storing said data message in said server prior to storing said data message in said second client computer.

34. A method according to claim 33 including the step of erasing said data message from storage in said server substantially immediately after storing said data message in said second client computer.

35. A method according to claim 29 including the step of disabling printing of said data message by said second client computer.

36. A method according to claim 29 including the step of enabling a single printing of one copy of said data message by said second client computer.

37. A method according to claim 29 including the step of limiting the time duration of display of said data message in accordance with said processing instruction data in said header.

38. A method according to claim 29 including the step of disabling copying of said data message in said second client computer.

39. A method according to claim 29 including the step of disabling forwarding of said data message in said second client computer.

40. A method according to claim 29 including the step of designating said data message with a security parameter.

41. A method according to claim 40 including the step of periodically erasing data messages stored in said second client computer.

42. A method according to claim 29 including the step of disabling archiving of said data message by said second client computer.

43. A method of communicating between processing devices comprising the steps of:
    a) creating in an originating processing device a header for a data message;

b) populating said header with address data and processing instruction data;

c) creating said data message;

d) storing said data message in at least one intermediate processing device;

e) storing said data message in an addressee processing device;

f) displaying said data message;

g) processing said data message in said addressee processing device responsive to said processing instruction data;

h) said processing including the step of erasing said data message from storage in said originating processing device in accordance with said processing instruction data;

i) processing said data message in said at least one intermediate processing device responsive to said processing instruction data;

j) said processing in said at least one intermediate processing device including the step of erasing said data message from storage in said intermediate processing device in accordance with said processing instruction data.

44. A method according to claim 43 including the steps of transmitting a copy of said message from said intermediate processing device to said addressee processing device, and erasing said message from said intermediate processing device upon transmitting said copy of said message to said addressee processing device.

45. A method according to claim 44 wherein said erasure of said message in said intermediate processing device occurs substantially immediately after transmitting said message to said addressee processing device.

46. A method according to claim 44 wherein said erasure of said message in said intermediate processing device occurs a predetermined time after transmitting said message to said addressee processing device.

47. A method according to claim 44 wherein said erasure of said message in said intermediate processing device occurs substantially immediately after transmitting said message to said addressee processing device and comprises over-writing said data message by address multiple times.

48. A method according to claim 44 wherein said erasing step comprises over-writing said data message multiple times.

49. A method according to claim 48 wherein successive over-writing steps utilize different over-write characters.

50. A method according to claim 44 wherein said erasing step renders said data message irrecoverable.

51. A method according to claim 44 wherein said erasing of said message from said intermediate processing device occurs pursuant to a periodic erasure.

52. A method according to claim 44 wherein said erasing of said message from said intermediate device comprises deleting said message and subsequently erasing said message in a manner that renders such message irretrievable.

53. A method according to claim 52 wherein said erasing of said message in a manner that renders such message irretrievable occurs pursuant to a periodic erasure.

54. A method of communicating between processing devices comprising the steps of:

a) creating in a first processing device a header for a data message;

b) populating said header with address data and processing instruction data;

c) creating said data message;

d) storing said data message in a second processing device;

e) displaying said data message;

f) processing said data message in said second processing device responsive to said processing instruction data;

g) said processing including the step of erasing said data message from storage in said second processing device in accordance with said processing instruction data, said erasure occurring substantially immediately prior to shut down of said second processing device.

\* \* \* \* \*